No. 741,916. PATENTED OCT. 20, 1903.
C. P. KRUS.
FISH HOOK.
APPLICATION FILED OCT. 6, 1902.
NO MODEL.
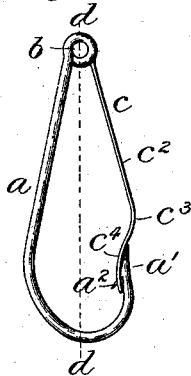
Fig. 1
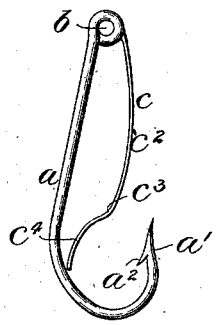
Fig. 2.
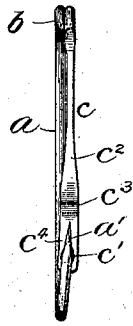
Fig. 3.
Fig. 4.
Witnesses:
John Enders Jr.
Geo. C. Dewson
Inventor:
Charles P. Krus,
By Dyrenforth, Dyrenforth & Lee,
Att'ys No. 741,916. Patented October 20, 1903.

UNITED STATES PATENT OFFICE.

CHARLES P. KRUS, OF CHICAGO, ILLINOIS.

FISH-HOOK.

SPECIFICATION forming part of Letters Patent No. 741,916, dated October 20, 1903.

Application filed October 6, 1902. Serial No. 126,112. (No model.)

*To all whom it may concern:*

Be it known that I, CHARLES P. KRUS, a citizen of the United States, residing at Chicago, in the county of Cook and State of Illinois, have invented a new and useful Improvement in Fish-Hooks, of which the following is a specification.

My invention relates particularly to so-called "weedless" or "antiweed" fish-hooks; and my primary object is to provide an improved hook of this character of cheapened construction.

The invention is illustrated in its preferred embodiment in the accompanying drawings, in which—

Figure 1 represents a side view of the improved hook; Fig. 2, a similar view showing the guard depressed; Fig. 3, a plan view of the hook, and Fig. 4 a plan view of a fragment of the guard or tongue.

In carrying out my invention I form from a piece of steel wire a hook $a$, eye $b$, and guard $c$. The hook has a point $a'$ and a barb $a^2$, the point being turned slightly to one side, preferably as shown in Fig. 3. The eye is formed, preferably, by coiling the wire so that the coil shall lie on the same side of the shank of the hook as does the point $a'$. The guard or tongue $c$ is preferably of considerably less cross-section than the hook and is formed by rolling or hammering or rolling and hammering one end of the wire employed. Preferably the extremity of the guard is flattened and provided with a perforation $c'$, which receives the barb $a^2$. To produce the desired result, one end portion of the wire may be rolled to produce a substantially uniform reduced cross-section, after which the extremity of the reduced section may be flattened and also further elongated, if desired. By preference, regarding the line $d\,d$ as the axis of the hook, the guard has an inclined or oblique portion $c^2$, a rounded angle $c^3$, and a curved extremity $c^4$.

The drawings show the portion $c^2$ of the tongue or guard of less cross-section than the extremity, and this result may be produced by a stamping or grinding operation or in any other suitable manner.

It should be stated that the guard affords a very delicate spring and should be either very mildly tempered or of small cross-section, or both. It is to be noted that the manner of coiling the wire to produce the eye locates the guard on the proper side of the shank of the hook to bring it into alinement with the point of the hook. The extremity of the guard conforms closely to the point of the hook, and the hump $c^3$ shelters the point from weeds, as is obvious. The guard while sufficiently resilient to prevent weeds from entering the hook and to prevent loss of bait is still sufficiently delicate to yield readily to the bite of the fish. After the hook has been "taken" the guard serves the useful purpose of preventing the fish from "getting off" the hook.

The extremity of the guard engages the hook near its point, but back of the barb, and under tension upon the hook the latter is sprung somewhat, so that the perforation of the guard locks under the barb. Incidentally this prevents the guard from ever slipping off the hook-point and getting above the same, and materially strengthens the hook.

Changes in minor details within the spirit of my invention may be made. Hence no undue limitation should be understood from the foregoing detailed description.

What I regard as new, and desire to secure by Letters Patent, is—

1. An improved article of manufacture, comprising a hook, eye and guard formed integrally with each other, said guard being of reduced cross-section adjacent to its base, for the purpose set forth.

2. An improved article of manufacture, comprising a hook, having a suitable point and barb, an eye formed integrally therewith, and a guard of reduced cross-section formed integrally with said eye and having a flattened perforate extremity engaging said barb, for the purpose set forth.

3. An improved article of manufacture, comprising a hook having a suitable point and barb, and a self-closing guard attached to the shank of the hook and provided at its free extremity with a perforation fitting over said barb and adjacent to the hook-point with a projection normally protecting said point, for the purpose set forth.

4. A weedless hook, comprising, in combination, a hook having a suitable shank, point and barb, and a normally closed guard carried by said shank and having at its extremity means engaging the hook near its point and back of the barb.

CHARLES P. KRUS.

In presence of—
L. HERSLAR,
J. H. LEE.